(12) United States Patent
Bui et al.

(10) Patent No.: US 9,206,776 B2
(45) Date of Patent: Dec. 8, 2015

(54) FUEL FEEDING SYSTEM AND METHOD OF OPERATING A FUEL FEEDING SYSTEM

(75) Inventors: Yves Bui, Trieste (IT); Mathias Jansson, Vaasa (FI); Soren Karlsson, Solf (FI)

(73) Assignee: WARTSILA FINLAND OY, Vaasa (FI)

( * ) Notice: Subject to any disclaimer, the term of this patent is extended or adjusted under 35 U.S.C. 154(b) by 106 days.

(21) Appl. No.: 13/996,227

(22) PCT Filed: Dec. 27, 2010

(86) PCT No.: PCT/FI2010/051090
§ 371 (c)(1),
(2), (4) Date: Jun. 20, 2013

(87) PCT Pub. No.: WO2012/089891
PCT Pub. Date: Jul. 5, 2012

(65) Prior Publication Data
US 2013/0269633 A1    Oct. 17, 2013

(51) Int. Cl.
*F02B 43/00*    (2006.01)
*F02M 37/00*   (2006.01)
(Continued)

(52) U.S. Cl.
CPC ........... *F02M 37/0064* (2013.01); *B63H 21/12* (2013.01); *B63H 21/38* (2013.01); *F02B 43/00* (2013.01); *F02B 43/10* (2013.01); *F02M 21/0221* (2013.01); *F17C 5/06* (2013.01);
(Continued)

(58) Field of Classification Search
CPC .... F02B 43/00; F02B 43/10; F02B 2043/103; F02B 43/12; B63H 21/12; F02M 21/0221; F02M 37/0064
See application file for complete search history.

(56) References Cited

U.S. PATENT DOCUMENTS

| 5,127,230 A | * | 7/1992 | Neeser et al. ...................... 62/7 |
| 5,231,838 A | | 8/1993 | Cieslukowski |

(Continued)

FOREIGN PATENT DOCUMENTS

| EP | 0069717 A1 | 1/1983 |
| JP | 2007516398 A | 6/2007 |

(Continued)

OTHER PUBLICATIONS

International Search Report for PCT/FI2010/051090 dated Nov. 29, 2011.

*Primary Examiner* — Lindsay Low
*Assistant Examiner* — Jacob Amick
(74) *Attorney, Agent, or Firm* — Heslin Rothenberg Farley Mesiti, PC; Victor A. Cardona

(57) ABSTRACT

A fuel feeding system for storing liquefied gas and feeding gaseous fuel to be used in a piston engine, which fuel feeding system includes at least two cryogenic fuel tank arrangements having a first tank arrangement and a second tank arrangement in connection with each other. The fuel feeding system includes a gaseous fuel feed line connected at its first end to at least one piston engine, in which system the first tank arrangement is provided with a pressure build-up system having a first heat exchanger unit. The inlet of the heat exchanger unit is connected to a bottom section of the first tank arrangement the outlet of which is connectable to the top section of the first tank arrangement. The first tank arrangement and the second tank arrangement are both pressure vessels, and the first tank arrangement is selectively connectable to the fuel feed line by a gas line extending from an outlet in the top section of the first tank arrangement.

12 Claims, 1 Drawing Sheet

(51) Int. Cl.
*F02B 43/10* (2006.01)
*B63H 21/12* (2006.01)
*F17C 5/06* (2006.01)
*F17C 9/02* (2006.01)
*F02M 21/02* (2006.01)
*B63H 21/38* (2006.01)

(52) U.S. Cl.
CPC ........... *F17C9/02* (2013.01); *F17C 2201/0157* (2013.01); *F17C 2201/052* (2013.01); *F17C 2201/054* (2013.01); *F17C 2205/0138* (2013.01); *F17C 2205/0142* (2013.01); *F17C 2221/033* (2013.01); *F17C 2223/0161* (2013.01); *F17C 2223/033* (2013.01); *F17C 2223/043* (2013.01); *F17C 2223/046* (2013.01); *F17C 2225/0123* (2013.01); *F17C 2225/0161* (2013.01); *F17C 2225/033* (2013.01); *F17C 2225/043* (2013.01); *F17C 2225/044* (2013.01); *F17C 2227/0107* (2013.01); *F17C 2227/0135* (2013.01); *F17C 2227/0309* (2013.01); *F17C 2227/0393* (2013.01); *F17C 2250/01* (2013.01); *F17C 2265/032* (2013.01); *F17C 2265/066* (2013.01); *F17C 2270/0105* (2013.01); *Y02T 10/32* (2013.01); *Y02T 70/5209* (2013.01); *Y02T 70/5218* (2013.01); *Y02T 90/46* (2013.01)

(56) References Cited

U.S. PATENT DOCUMENTS

| 5,329,777 | A | 7/1994 | Weltmer, Jr. | |
| 5,421,162 | A | 6/1995 | Gustafson et al. | |
| 5,687,776 | A * | 11/1997 | Forgash et al. | 141/11 |
| 7,497,180 | B2 | 3/2009 | Karlsson et al. | |
| 7,955,149 | B2 | 6/2011 | Levander et al. | |
| 2007/0175226 | A1 * | 8/2007 | Karlsson et al. | 62/50.6 |

FOREIGN PATENT DOCUMENTS

| JP | 2009541140 A | 11/2009 |
| WO | 2005/058692 A1 | 6/2005 |
| WO | 2008000898 A1 | 1/2008 |

* cited by examiner

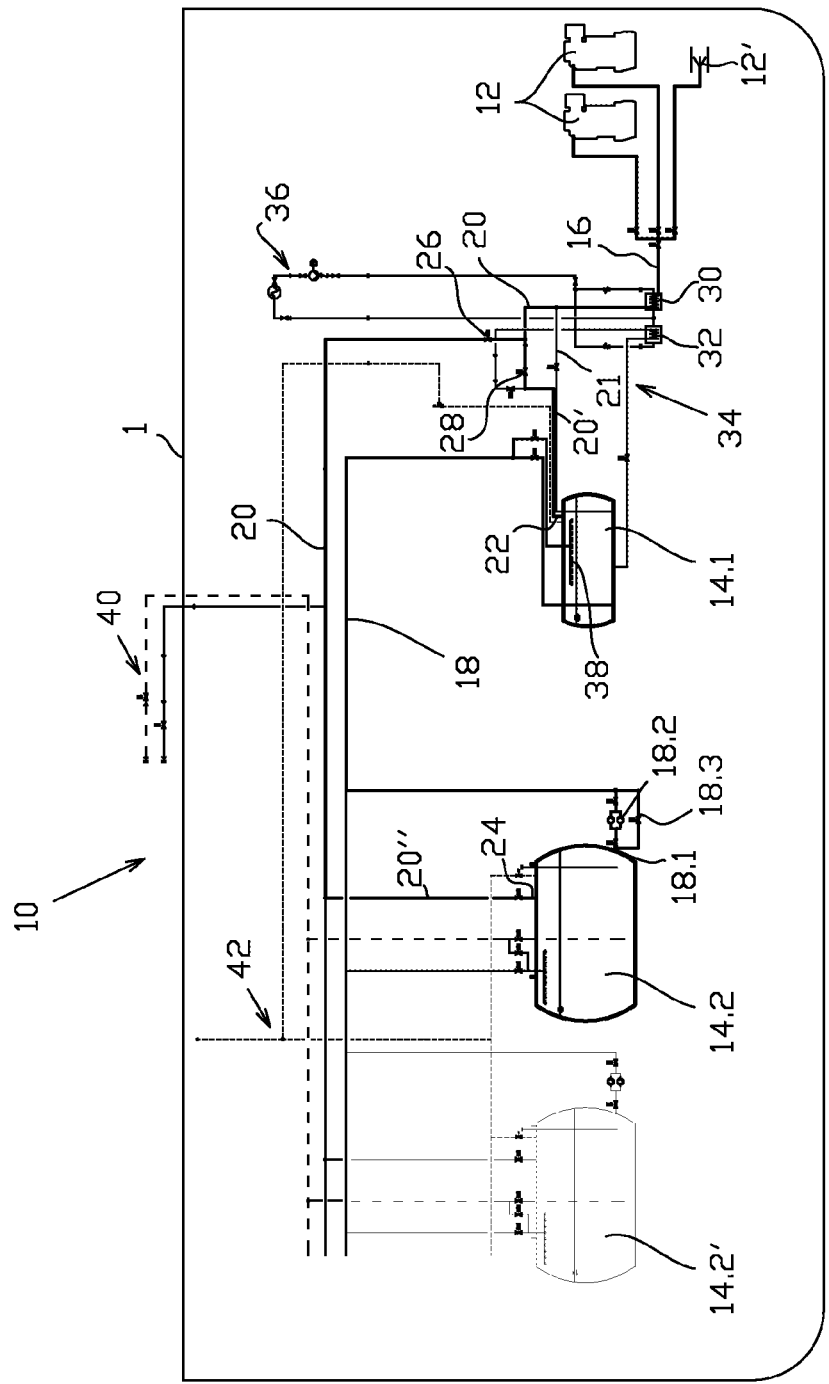

FUEL FEEDING SYSTEM AND METHOD OF OPERATING A FUEL FEEDING SYSTEM

CROSS REFERENCE TO RELATED APPLICATIONS

This application is a 371 National Phase of International Application Number PCT/FI2010/051090 filed on Dec. 27, 2010, and published in English on Jul. 5, 2012 as International Publication Number WO 2012/089891 A1, the entire disclosure of which is incorporated herein by reference.

TECHNICAL FIELD

The invention relates to fuel feeding system for storing liquefied gas and feeding gaseous fuel to be used in a piston engine, which fuel feeding system comprises at least two cryogenic fuel tank arrangements comprising a first tank arrangement and a second tank arrangement in connection with each other, and which fuel feeding system comprises a gaseous fuel feed line connected at its first end to at least one piston engine, in which system the first tank arrangement is provided with a pressure build-up system comprising an first heat exchanger unit the inlet of which is connected to a bottom section of the first tank arrangement the outlet of which is connectable to the top section of the first tank arrangement.

The invention relates also to method of operating a fuel feeding system, in which method fuel is stored in at least two cryogenic fuel tank arrangements comprising a first tank arrangement and a second tank arrangement arranged in connection with each other, and in which method fuel is fed in gaseous form through a gaseous fuel feed line to at least one piston engine, and the pressure in the first tank arrangement is maintained with a pressure build-up system comprising a first heat exchanger unit the inlet of which is connected to a bottom section of the first tank arrangement and the outlet of which is connected to the top section of the first tank arrangement.

BACKGROUND ART

Gas is becoming a more and more attractive fuel for ships' and other marine vessels' prime movers and auxiliary engines. Particularly but not exclusively natural gas (NG) is feasible due to its availability. Natural gas is a gaseous mixture in the ambient circumstances consisting primarily of methane and small amounts of ethane, propane, butane and nitrogen. It has a high hydrogen content relative to coal, so when combusted it provides inter alia low amount of emissions, very clean burning process and it is basically free of contaminants. Particularly in cruise vessels, ferries and so called ropax vessels, where passengers are on board, the absence of soot emissions and visible smoke in the exhaust gases of the ship's engines is a very important feature facilitated by using NG as fuel for the engines but also for vessels carrying goods and bulk materials. Usually natural gas is stored as liquefied natural gas (LNG) at temperature of about −162° C.

EP0069717 B1 discloses a method of utilising compressed boil-off gas from cryogenic liquids as fuel in a dual gas/oil burning diesel engine on board a vessel. In the method the compressed boil-off gas is introduced into the combustion chamber of the engine during combustion by high pressure injection which is controlled in accordance with the combustion pressure, desired revolutions per minute and output power. The system comprises a gas compressor whose suction side is connected to the storage tank containing the cryogenic liquid, and a buffer storage tank between the storage tank engine, which buffer storage tank receives compressed gas from the compressor. Thus the solution of EP0069717 B1 allows only the gas in gaseous phase in the storage tank to be utilized as fuel for the engine.

WO 2008000898 discloses fuel system for a gas-driven piston engine in a marine vessel, in which gas is stored in at least one fuel storage tank in the marine vessel as liquefied gas, and which fuel system further comprises a separate fuel feed tank in connection with the fuel storage tank. The fuel feed tank is a heat insulated pressure vessel in which the gas is stored in liquid phase and at elevated pressure. The gas is also in liquid phase in the fuel storage tank, in which prevails only hydrostatic pressure caused by the liquid gas. The publication shows also a heat exchanger arranged in a fuel feed line which connects the fuel feed tank to the gas driven piston engine, by means of which the liquefied gas may be evaporated prior to feeding to the piston engines. Since the pressure in the fuel storage tank is only hydrostatic pressure caused by the liquid gas there is a need for dedicated compressors to prevent excessive pressure build-up in the storage tanks by transferring the gas to the fuel feed tank at higher pressure. Due to the coupling of the storage tank and the feed tank, WO 2008000898 has a shortcoming particularly in the flexibility of utilizing the gas as fuel for the engine.

Although the fuel system shown in WO 2008000898 may be advantageous as such, there has recently come out demands to further develop such a fuel system. It is an object of the invention to provide a fuel feeding system for storing liquefied gas and feeding gaseous fuel to be used in a piston engine, which provides more flexible utilization of the gas as fuel for a gas-operated piston engine.

DISCLOSURE OF THE INVENTION

Objects of the invention are met substantially as is disclosed in claims 1 and 8. The other claims present more details of different embodiments of the invention.

According to a preferred embodiment of the invention the fuel feeding system for storing liquefied gas and feeding gaseous fuel to be used in a piston engine, which fuel feeding system comprises at least two cryogenic fuel tank arrangements comprising a first tank arrangement and a second tank arrangement in connection with each other, and which fuel feeding system comprises a gaseous fuel feed line connected at its first end to at least one piston engine, in which system the first tank arrangement is provided with a pressure build-up system comprising a first heat exchanger unit the inlet of which is connected to a bottom section of the first tank arrangement the outlet of which is connectable to the top section of the first tank arrangement. In the system the first tank arrangement and the second tank arrangement are both pressure vessels, and the first tank arrangement is selectively connectable to the fuel feed line by a gas line extending from an outlet in the top section of the first tank arrangement to the fuel feed line.

The tanks are also connected by a liquid NG line from the bottom of the second tank to the bottom of the first tanks through a cryogenic pump or pumps and the relevant by-passes.

In this connection the pressure vessel means a tank arrangement the design pressure of which is greater than the hydrostatic pressure of liquid NG in the tank arrangement.

The second tank arrangement is also selectively connectable from an outlet in the top section of the second tank arrangement to the fuel feed line. This provides a possibility to feed gas directly from the second tank arrangement to the fuel feed line.

The first tank arrangement and the second tank arrangement are both pressure vessels and the first tank arrangement and the second tank arrangement are arranged to withhold at least the required gas feed pressure of the piston engine. This way both of the tank arrangements may feed gaseous fuel substantially directly to the engines or the other gas users like gas burner boilers.

According to an embodiment of the invention the required gas feed pressure of the piston engine is arranged to build up solely by means of natural and/or forced evaporation of the liquefied gas.

According to an embodiment of the invention the fuel feed line is connectable to the top section of the first tank arrangement, and a second heat exchanger unit is adapted for heating the gas prior to feeding it to the piston engine.

According to another embodiment of the invention the fuel feed line is connectable to the bottom section of the first tank arrangement, and a second heat exchanger unit is adapted for evaporating and heating the gas prior to feeding it to the piston engine.

Advantageously the gaseous fuel feed line connected at its first end to at least one piston engine is at its second end connectable with the top section of the first tank arrangement, and with the top section of the second tank arrangement and with the outlet of the first heat exchanger unit.

Preferably the second tank arrangement is connectable from an outlet in the bottom section of the second tank arrangement to the first tank arrangement.

According to an embodiment of the invention in the method of operating a fuel feeding system fuel is stored in at least two cryogenic fuel tank arrangements comprising a first tank arrangement and a second tank arrangement arranged in connection with each other, and in which method fuel is fed in gaseous form through a gaseous fuel feed line to at least one piston engine and the pressure in the first tank arrangement is maintained with a pressure build-up system comprising a first heat exchanger unit the inlet of which is connected to a bottom section of the first tank arrangement and the outlet of which is connected to the top section of the first tank arrangement. The fuel feeding system according to an embodiment of the invention is operated so that a required gas feed pressure of the piston engine is maintained in the second tank arrangement and in the case of the demand of the gas flow rate increases above the supply gas flow rate of the second tank arrangement the pressure build-up system in the first tank arrangement is operated so that the gas flow rate required to meet the demand of the gas flow rate is generated in the first tank arrangement. Additionally, in the case of the demand of the gas flow rate increases above the supply gas flow rate of the second tank arrangement the transfer pump or pumps are used for transferring the liquid NG to the first tank arrangement.

Gas is preferably heated prior to feeding it to the piston engine.

Liquefied gas is conveyed from the second tank arrangement to the first tank arrangement at least in the amount to meet at least the gas flow rate generated in the first tank arrangement.

The required gas feed pressure of the piston engine is build up solely by means of natural and/or forced evaporation of the liquefied gas.

The fuel feeding system and the method of feeding fuel according to the invention may be advantageously adapted in connection with piston engines arranged to power a marine vessel, particularly such marine vessel which carries passengers and possibly also vessels carrying merchant cargo.

BRIEF DESCRIPTION OF DRAWINGS

In the following the invention will be described with reference to the accompanying schematic drawing, in which FIG. 1 illustrates an embodiment of the fuel feeding system according to the invention.

BEST MODE FOR CARRYING OUT THE INVENTION

FIG. 1 describes an embodiment of the fuel feeding system 10 according to the invention. The fuel feeding system is adapted for storing gas as liquefied gas and for feeding gaseous gas as a fuel into at least one piston engine 12. In the fuel feeding system 10 there is provided at least two cryogenic fuel tank arrangements 14.1, 14.2, a first tank arrangement 14.1 and a second tank arrangement in 14.2. As shown in FIG. 1 there may be several second tank arrangements 14.2' parallel coupled with each other. In FIG. 1 there is very schematically shown a marine vessel 1, which is a cruise vessel as an example. For safety reasons either or both of the first and the second tank arrangements may be provided with double walls (not shown.)

The gas in the first tank arrangement and the second tank arrangement is stored at a temperature of $-162°$ C. described as cryogenic conditions. Typically the gas fills the tank so that a part of the gas is as liquefied gas and part as gaseous gas. The tank arrangement comprises insulation (not shown) to prevent excessive warming up of the LNG in the tank arrangement.

The first and the second tank arrangements 14.1, 14.2 are in connection with each other so, that at least liquefied gas may be transferred from the second tank arrangement 14.2 to the first tank arrangement 14.1. Thus, the system is provided with a liquefied gas feed line 18 which is connected to an outlet 18.1 arranged to bottom section of the second tank arrangement 14.2. Liquefied gas may be taken into the liquefied gas feed line 18 and fed further to the first tank arrangement 14.1. Liquefied gas is conveyed from the second tank arrangement to the first tank arrangement at least with an amount of to meet at least the gas flow rate generated in the first tank arrangement 14.1. This way the surface level in the first tank arrangement 14.1 is maintained within a predetermined range by transporting liquefied gas from the second tank arrangement 14.2 to the first tank arrangement 14.1.

The liquefied gas feed line 18 is connected to the first tank arrangement 14.1 so that liquefied gas may be selectively brought into to bottom section of the tank arrangement 14.1 or into an ullage space of first tank arrangement 14.1 via a spraying device 38 arranged into the upper part of the first tank arrangement 14.1. This provides means for controlling pressure in the first tank arrangement 14.1 by controlling the amount of liquefied gas sprayed into the ullage space. Spraying the liquefied gas into the ullage space causes the gas to cool down which decreases the pressure in the tank.

The liquefied gas feed line 18 is provided with cryogenic pump or pumps 18.2 by means of which the pressure rise of the liquefied gas may be accomplished in order to bring about the transfer of the liquefied gas from the second tank arrangement 14.2 to the pressure prevailing or maintained in the first tank arrangement 14.1. The pumps 18.2 are preferably located outside the second tank arrangement 14.2, but submerged pumps inside the tank are also possible if top connections are used. There is also a bypass line 18.3 arranged to by-pass the pump or the pumps 18.2 for operating the system so, that the pressure prevailing in the second tank arrangement 14.2 of the liquefied gas is used to bring about the transfer of the liquefied gas from the second tank arrangement 14.2 to the first tank arrangement 14.1. This feature may be used as primary or as back-up means according to the situation.

The pressure in the second tank arrangement 14.2 is controlled so that the pressure in the second tank arrangement 14.2 is preferably at least 0.5 bar higher than in the first tank arrangement 14.1.

According to an embodiment of the invention the pressure in the second tank arrangement 14.2 can be controlled so that in the first mode of operation its pressure is increased by generating more gaseous LNG in the first tank arrangement 14.1 using the first heat exchanger unit 32, and setting valve 26 in the gas line 20 between the first heat exchanger unit 32 and second tank arrangement 14.2 in open position. This opens the connection between the gas space of the second tank arrangement to the first heat exchanger unit 32 and causes the pressure increase in the second tank arrangement. In a second mode of operation the pressure in the second tank arrangement 14.2 can be adjusted lower. This is accomplished by circulating liquid LNG by the pump or pumps 18.2 into the spraying device 38 provided in the second tank arrangement 12.2 and spraying the liquefied gas into the ullage space, which causes the gas to cool down decreasing the pressure in the second tank arrangement 14.2.

The first and the second tank arrangements 14.1, 14.2 are in connection with each other via a gas line 20 which extends from an outlet 22 in the top section of the first tank arrangement 14.1 and from an outlet 24 in the top section of the second tank arrangement 14.2 to the fuel feed line 16.

According to the invention both the first and the second tank arrangement are arranged to withhold the required gas feed pressure of the piston engine. The liquefied natural gas occupies about 600 times less space than gas in its gaseous state, making it a practical fuel for piston engines particularly in marine vessels. Preferably the first and the second tank arrangement are arranged to withhold at least a 0.5 MPa pressure so that gaseous gas may be fed directly to the engines 12 even without using a compressors in the gas feed line 20.

The fuel feeding system comprises a fuel feed line 16 for gaseous gas connected at its first end to at least one piston engine 12 or other gas consumption unit like a gas burner boilers 12'. At least one other gas consumption unit must be provided in order to be able to dispose any excessive gas in all circumstances.

The fuel feed line 16 is also selectively connectable with the first tank arrangement 14.1 and the second tank arrangement 14.2 by the gas line 20. There is a branch gas line 20' which is provided with a control valve 28. In order to provide the functionality of the fuel feed line 16 being selectively connectable, the gas line 20 is also provided with a control valve 26 upstream the branch gas line 20'. The gas line 20 is provided with a second heat exchanger unit 30 to which also the fuel feed line 16 is connected.

The fuel feeding system comprises a pressure build-up system 34 in connection with the first tank arrangement 14.1. The pressure build-up system comprises a first heat exchanger unit 32 the inlet of which is connected to a bottom section of the first tank arrangement 14.1 the outlet of which is connectable to the top section of the first tank arrangement 14.1 and/or to the gas line 20 upstream the second heat exchanger unit 30. The pressure build-up system forms a circulation system extending from the bottom section of the first tank arrangement to the upper section of the first tank arrangement and being provided with the first heat exchanger unit 32.

The pressure build-up system is used for regulating the pressure in the first tank arrangement to be within a predetermined range.

The second heat exchanger unit 30 and the first heat exchanger unit 32 are connected to a heat transfer system 36 which provides heat to the second heat exchanger unit 30 and the first heat exchanger unit 32 in order to evaporate liquefied gas and/or heat gaseous gas.

During the operation of the system after it has been filled properly through its filling system 40, boil of gas is generated in the second tank arrangement 14.2. The valve 26 in the gas line 20 is open and gaseous gas may flow into the fuel feed line 16 after heating in the second exchanger unit 30 provided that the pressure in the second tank system is high enough for the engines. In case the gas demand of the engines 12 is higher than the current supply via gas line 20 the valve 28 is opened and additional gas is led from the first tank arrangement 14.1 to the fuel supply line 16. The required amount of gaseous gas may be generated from the liquefied gas in the first tank arrangement 14.1 by means of the pressure build-up system 34.

Thus the fuel feeding system is operated according to an embodiment of the invention in steady-state conditions so that a first gas flow rate is generated in the first tank arrangement 14.1 by operating the pressure build-up system while a second gas flow rate is generated in the second tank arrangement by means of natural evaporation and/or forced evaporation. The pressure build-up system 34 is operated so that in the case of the actual demand of the gas flow rate of the engines increases above the second gas flow rate of the second tank arrangement the pressure build-up system in the first tank arrangement 14.1 is operated to increase the gas flow rate required to meet the demand of the gas flow rate.

Additionally the system includes a liquefied gas channel 21 which connects the bottom section of the first tank arrangement 14.1 directly to a location upstream the second heat exchanger unit 30 which makes it possible to operate the system so that forced boil of gas is generated in the second heat exchanger unit 30 e.g. in case the capacity of the pressure build-up system is not enough to fulfil the demand.

Depending on the selected mode of operation of the fuel feeding system, gaseous gas may be fed to the piston engine by making use of less than one gas compressors in the gaseous fuel feed line 16 i.e. at least in normal operation no gas compressors are needed.

If the design pressure of the second tank arrangement is lower than the pressure needed for the engines 12 and the gas users 12' the pressure of the LNG may be increased to the required level when transferred with the pump or pumps 8.2. into the first tank arrangement 14.1.

The system is also provided with a pressure relief system 42 for preventing a generation of excessive pressure in the system.

It is to be noted that only a few most advantageous embodiments of the invention have been described in the above. Thus, it is clear that the invention is not limited to the above-described embodiments, but may be applied in many ways within the scope of the appended claims. The features disclosed in connection with various embodiments can also be used in connection with other embodiments within the inventive scope and/or different assemblies can be combined from the disclosed features, should it be desired and should it be technically feasible.

The invention claimed is:

1. A fuel feeding system for storing liquefied gas and feeding gaseous fuel to be used in a piston engine, which fuel feeding system comprises:
   at least two cryogenic fuel tank arrangements comprising a first tank arrangement and a second tank arrangement in connection with each other;
   a gaseous fuel feed line connected at a first end thereof to at least one piston engine;
   the first tank arrangement provided with a pressure build-up system comprising a first heat exchanger unit, the inlet of said first heat exchange unit connected to a bottom section of the first tank arrangement, the outlet of said first heat exchange unit connectable to a top section of the first tank arrangement,
   the first tank arrangement and the second tank arrangement both being pressure vessels, and the first tank arrangement is selectively connectable to the gaseous fuel feed line by a gas line extending from an outlet in the top section of the first tank arrangement,
   wherein the second tank arrangement is connected from an outlet in a bottom section of the second tank arrangement to the first tank arrangement so that liquefied gas may be selectively brought into the bottom section of the first tank arrangement or into an ullage space of the first tank arrangement via a spraying device arranged into an upper part of the first tank arrangement, and
   the first and the second tank arrangements in connection with each other via a gas line which extends from an outlet in the top section of the first tank arrangement and from an outlet in a top section of the second tank arrangement to the gaseous fuel feed line to provide selectively connectable gas flow from the first and the second tank arrangements to the gaseous fuel feed line.

2. A fuel feeding system according to claim 1, wherein the second tank arrangement is selectively connectable from an outlet in the top section of the second tank arrangement to the fuel feed line.

3. A fuel feeding system according to claim 1, wherein the first tank arrangement and the second tank arrangement are arranged to withhold at least the required gas feed pressure of the piston engine.

4. A fuel feeding system according to claim 1, wherein the required gas feed pressure of the piston engine is arranged to build up solely by means of natural and/or forced evaporation of the liquefied gas.

5. A fuel feeding system according to claim 1, wherein the fuel feed line is connectable to the top section of the first tank arrangement, and a second heat exchanger unit is adapted for heating the gas prior to feeding the gas to the piston engine.

6. A fuel feeding system according to claim 1, wherein the gaseous fuel feed line connected at its first end to at least one piston engine is at its second end connectable with the top section of the first tank arrangement, and with the top section of the second tank arrangement and with the outlet of the first heat exchanger unit.

7. A method of operating a fuel feeding system, the method comprising;
   storing fuel in at least two cryogenic fuel tank arrangements comprising a first tank arrangement and a second tank arrangement arranged in connection with each other,
   feeding fuel in gaseous form through a gaseous fuel feed line to at least one piston engine, and
      while feeding the fuel to said at least one piston engine maintaining a pressure in the first tank arrangement with a pressure build-up system comprising a first heat exchanger unit the inlet of which is connected to a bottom section of the first tank arrangement and the outlet of which is connected to the top section of the first tank arrangement, and
      operating the fuel feeding system so that a required gas feed pressure of the piston engine is maintained in the second tank arrangement, and
      in the case of the demand of the gas flow rate increases above the supply gas flow rate of the second tank arrangement, operating the pressure build-up system in the first tank arrangement so that the gas flow rate required to meet the demand of the gas flow rate is generated in the first tank arrangement.

8. A method of operating a fuel feeding system according to claim 7, wherein the gas is heated prior to feeding the gas to the piston engine.

9. A method of operating a fuel feeding system according to claim 7, wherein liquefied gas is conveyed from the second tank arrangement to the first tank arrangement at least in the amount of to meet at least the gas flow rate generated in the first tank arrangement.

10. A method of operating a fuel feeding system according to claim 7, wherein the required gas feed pressure of the piston engine builds up solely by means of natural and/or forced evaporation of the liquefied gas.

11. A method of operating a fuel feeding system according to claim 7, wherein the pressure in the second tank arrangement controlled so that the pressure in the second tank arrangement is preferably at least 0.5 bar higher than in the first tank arrangement.

12. A method of operating a fuel feeding system according to claim 7, wherein a first gas flow rate is generated in the first tank arrangement by operating the pressure build-up system while a second gas flow rate is generated in the second tank arrangement by means of natural evaporation and/or forced evaporation.

* * * * *